US010647898B2

United States Patent
Yu et al.

(10) Patent No.: US 10,647,898 B2
(45) Date of Patent: May 12, 2020

(54) POLARIZING PLATE USING ADHESIVE COMPOSITION AND OPTICAL MEMBER COMPRISING THE SAME

(71) Applicants: Mi Yeon Yu, Uiwang-si (KR); Tae Hyun Lee, Uiwang-si (KR); Do Heon Lee, Uiwang-si (KR); Ik Hwan Cho, Uiwang-si (KR); In Cheon Han, Uiwang-si (KR)

(72) Inventors: Mi Yeon Yu, Uiwang-si (KR); Tae Hyun Lee, Uiwang-si (KR); Do Heon Lee, Uiwang-si (KR); Ik Hwan Cho, Uiwang-si (KR); In Cheon Han, Uiwang-si (KR)

(73) Assignee: Cheil Industries, Inc., Gumi-Si, Gyeongsangbuk-do (KR)

( * ) Notice: Subject to any disclaimer, the term of this patent is extended or adjusted under 35 U.S.C. 154(b) by 0 days.

(21) Appl. No.: 16/115,792

(22) Filed: Aug. 29, 2018

(65) Prior Publication Data

US 2019/0002745 A1   Jan. 3, 2019

Related U.S. Application Data

(62) Division of application No. 14/407,376, filed as application No. PCT/KR2013/001568 on Feb. 27, 2013, now abandoned.

(30) Foreign Application Priority Data

Jun. 12, 2012   (KR) .................. 10-2012-0062917

(51) Int. Cl.
*C09J 163/00*   (2006.01)
*C08L 71/00*   (2006.01)
(Continued)

(52) U.S. Cl.
CPC .............. *C09J 163/00* (2013.01); *B32B 7/12* (2013.01); *B32B 37/1284* (2013.01);
(Continued)

(58) Field of Classification Search
CPC ...................................................... C09J 163/00
See application file for complete search history.

(56) References Cited

U.S. PATENT DOCUMENTS 7,846,999 B2   12/2010   Amano et al.
2002/0008333 A1   1/2002   Napadensky et al.
(Continued)

FOREIGN PATENT DOCUMENTS

CN   1339055 A   3/2002
CN   102408839 A   4/2012
(Continued)

OTHER PUBLICATIONS

Office Action dated Oct. 9, 2015 in corresponding Chinese Patent Application No. 201380036447.8.
(Continued)

*Primary Examiner* — Megan McCulley
(74) *Attorney, Agent, or Firm* — Lee IP Law, PC

(57) ABSTRACT

Disclosed are an adhesive composition for polarizing plates, a polarizing plate using the same, a method for preparing the same, and an optical member including the same. The adhesive composition includes (A) a (meth)acrylic radical compound, (B) a cationic epoxy compound, (C) a phenoxy resin, and (D) a photoinitiator.

9 Claims, 1 Drawing Sheet

(51) Int. Cl.
*C09J 171/10* (2006.01)
*G02B 5/30* (2006.01)
*C09J 7/20* (2018.01)
*B32B 7/12* (2006.01)
*B32B 37/12* (2006.01)
*B32B 37/18* (2006.01)
*B32B 38/00* (2006.01)

(52) U.S. Cl.
CPC .......... *B32B 37/18* (2013.01); *B32B 38/0008* (2013.01); *C08L 71/00* (2013.01); *C09J 7/20* (2018.01); *C09J 171/10* (2013.01); *G02B 5/30* (2013.01); *G02B 5/3025* (2013.01); *B32B 2551/00* (2013.01); *C08G 2650/56* (2013.01); *Y10T 428/287* (2015.01); *Y10T 428/31515* (2015.04)

(56) References Cited

U.S. PATENT DOCUMENTS

| | | |
|---|---|---|
| 2002/0086161 A1 | 7/2002 | Smetana et al. |
| 2002/0177073 A1 | 11/2002 | Melisaris et al. |
| 2008/0261039 A1 | 10/2008 | Tanaka et al. |
| 2010/0129045 A1 | 5/2010 | Shibata et al. |
| 2011/0043727 A1 | 2/2011 | Bösl et al. |
| 2011/0221331 A1 | 9/2011 | Yu et al. |
| 2012/0207991 A1 | 8/2012 | Arai et al. |
| 2014/0161995 A1 | 6/2014 | Cho et al. |

FOREIGN PATENT DOCUMENTS

| | | |
|---|---|---|
| JP | 2008-233874 A | 10/2008 |
| KR | 10-0820175 B1 | 4/2008 |
| KR | 10-2010-0139014 A | 12/2010 |
| KR | 10-1010574 B1 | 1/2011 |
| KR | 10-2012-0030977 A | 3/2012 |
| TW | 201141978 A | 12/2011 |

OTHER PUBLICATIONS

Office Action dated Apr. 8, 2015 in corresponding Taiwanese Patent Application No. 102120731.

POLARIZING PLATE USING ADHESIVE COMPOSITION AND OPTICAL MEMBER COMPRISING THE SAME

CROSS-REFERENCE TO RELATED APPLICATION

This is a divisional application based on pending application Ser. No. 14/407,376, filed Dec. 11, 2014, which is the U.S. National phase of PCT/KR2013/001568, filed Feb. 27, 2013, the entire contents of which is hereby incorporated by reference.

Korean Patent Application No. 10-2012-0062917, filed on Jun. 12, 2012, in the Korean Intellectual Property Office, is incorporated by reference herein in its entirety.

BACKGROUND

1. Field

The present invention relates to an adhesive composition for polarizing plates, a polarizing plate using the same, a method for preparing the same, and an optical member including the same.

2. Description of the Related Art

Adhesives for polarizing plates are used to attach a protective film to one or both sides of a polarizer including a PVA film. As such adhesives for polarizing plates, hydrophilic and water-soluble aqueous PVA adhesives are widely used in the art. However, a polarizing plate prepared using aqueous adhesives may suffer dimensional change due to heat from a backlight, casing localized screen distortion. As a result, partial light leakage can become significant in the case of allowing the overall screen to be displayed in a black state. Thus, the use of a cation polymerizable UV curing adhesive is proposed instead of the aqueous adhesives (For example, Japanese Patent Publication No. 2008-233874A, and the like).

However, since the cation polymerizable UV curing adhesive entails dark reaction (post-polymerization) after UV irradiation, a cured product of the adhesive can be easily wound during storage when prepared in the form of a wound roll. Moreover, the cation polymerizable UV curing adhesive is vulnerable to moisture in the course of curing, thereby making it difficult to maintain curing consistency. Thus, in order to obtain a uniformly cured state, it is necessary to strictly control not only surrounding moisture, but also the content of moisture in a PVA-based polarizer.

To fulfill operating conditions of the polarizing plate, there is a need for a polarizing plate that has better wet-heat resistance than typical polarizing plates in the art and includes an adhesive layer providing strong adhesion and high reliability, and outstanding cohesion, durability and waterproofing.

SUMMARY

Embodiments are directed to CLAIM LANGUAGE TO BE ADDED

In accordance with one aspect of the invention, an adhesive composition for polarizing plates may include: (A) a (meth)acrylic radical compound, (B) a cationic epoxy compound, (C) a phenoxy resin, and (D) a photoinitiator.

In accordance with another aspect of the invention, a method for preparing an adhesive composition for polarizing plates may include: mixing a (meth)acrylic radical compound, a cationic epoxy compound and a photoinitiator, and adding a phenoxy resin to the mixture.

In accordance with a further aspect of the invention, a polarizing plate may include a polarizer and a protective film stacked on one or both sides of the polarizer via an adhesive layer, wherein the polarizer has a maximum shrinkage length of about 2 mm or less at one end thereof when the polarizing plate is dipped in water having constant temperature of 60° C. for 2 hours.

In accordance with yet another aspect of the invention, an optical member may include the adhesive layer or the polarizing plate.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
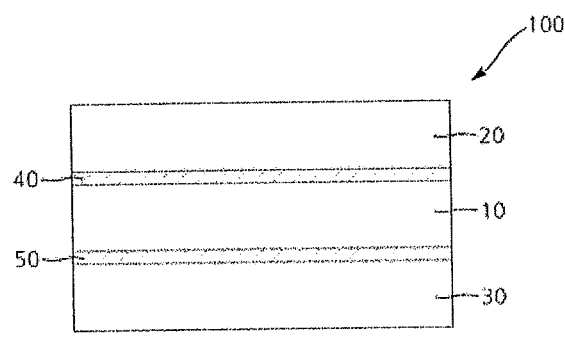
FIG. 1 illustrates a sectional view of a polarizing plate in accordance with one embodiment of the present invention.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "upper" and "lower" are defined with reference to the drawings and may also be interpreted as 'lower' and 'upper' according to orientations, respectively.

In accordance with one aspect of the invention, an adhesive composition for polarizing plates may include (A) a (meth)acrylic radical compound, (B) a cationic epoxy compound, (C) a phenoxy resin, and (D) a photoinitiator.

Herein, the term "compound" includes monomers, oligomers, resins, and the like.

(Meth)Acrylic Radical Compound

The (meth)acrylic radical compound may exhibit high reactivity without suffering reaction interference by moisture of a polarizer. Further, the (meth)acrylic radical compound may improve adhesion with respect to an interface with the polarizer or a protective film during curing and may create a chain transfer bond by including a hydrophilic group with an activated cationic epoxy compound.

The (meth)acrylic radical compound may include a (meth)acrylic compound having at least one hydrophilic group. The hydrophilic group may include at least one of a hydroxyl group and a carboxylic acid group. Preferably, the hydrophilic group may be a hydroxyl group.

The (meth)acrylic radical compound may be a monofunctional (meth)acrylic radical compound rather than polyfunctional (meth)acrylic radical compounds in view of structural flexibility of adhesive layer for polarizing plate.

The (meth)acrylic radical compound may include at least one selected from among (meth)acrylates containing $C_1$-$C_{20}$ alkyl group having at least one hydrophilic group, (meth)acrylates containing $C_3$-$C_{20}$ alicyclic group having at least one hydrophilic group, and (meth)acrylates containing $C_6$-$C_{20}$ aryl group having at least one hydrophilic group.

In some embodiments, the (meth)acrylic radical compound may include at least one selected from the group consisting of 2-hydroxyethyl (meth)acrylate, 4-hydroxybutyl (meth)acrylate, 2-hydroxypropyl (meth)acrylate, 2-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono (meth)acrylate, 1,6-hexanediol mono(meth)acrylate, 2-hydroxy-3-phenyloxypropyl (meth)acrylate, 4-hydroxycyclopentyl (meth)acrylate, 2-hydroxy-3-phenyloxybutyl (meth)acrylate, and 4-hydroxycyclohexyl (meth)acrylate, without being limited thereto.

The (meth)acrylic radical compound may be present in an amount of about 1 part by weight to 86 parts by weight based on 100 parts by weight of (A)+(B)+(C). Within this range, the composition can prevent deterioration in adhesion due to reduction of cohesion, deterioration in reliability due to not generating tack by reduction of modulus, and can provide good water resistance by preventing decolorization of the polarizer when dipped in warm water. The (meth)acrylic radical compound is preferably present in an amount of about 10 parts by weight to about 77.5 parts by weight, more preferably about 10 parts by weight to about 57 parts by weight, still more preferably about 19.85 parts by weight to about 49.85 parts by weight.

Cationic Epoxy Compound

The cationic epoxy compound imparts adhesion between the polarizer and the protective film while providing high reliability based on inherent stiffness of an epoxy. Further, the cationic epoxy compound may provide cohesion by entanglement of molecular chains with the (meth)acrylic radical compound and chain transfer coupling with the hydrophilic group of the (meth)acrylic radical compound.

The cationic epoxy compound may be an alicyclic epoxy compound, an aromatic epoxy compound, an aliphatic epoxy compound, a hydrogenated epoxy compound, or mixtures thereof.

The alicyclic epoxy compound may be a compound having at least one epoxy group at an alicyclic ring. The alicyclic epoxy compound may be an alicyclic diepoxy carboxylate. Examples of the alicyclic epoxy compound may include 3,4-epoxycyclohexylmethyl-3',4'-epoxycyclohexane carboxylate, 2-(3,4-epoxycyclohexyl-5,5-spiro-3,4-epoxy)cyclohexane-meta-dioxane, bis(3,4-epoxycyclohexylmethyl)adipate, bis((3,4-epoxy-6-methylcyclohexyl)methyl)adipate, 3,4-epoxy-6-methylcyclohexyl-3',4'-epoxy-6'-methylcyclohexane carboxylate, ε-caprolactone-modified 3,4-epoxycyclohexylmethyl-3',4'-epoxycyclohexane carboxylate, trimethylcaprolactone-modified 3,4-epoxycyclohexylmethyl-3',4'-epoxycyclohexane carboxylate, β-methyl-δ-valerolactone-modified 3,4-epoxycyclohexylmethyl-3'4,'-epoxycyclohexane carboxylate, methylenebis(3,4-epoxycyclohexane), di(3,4-epoxycyclohexylmethyl)ether of ethylene glycol, ethylenebis(3,4-epoxycyclohexanecarboxylate), dioctyl epoxycyclohexahydro phthalate, di-2-ethylhexyl epoxycyclohexahydro phthalate, and the like.

Examples of the aromatic epoxy compound may include bisphenol A, F, and phenol novolac, cresol novolac, bisphenol A-novolac, dichloropentadien novolac, glycidyl ether of triphenolmethane, triglycidyl-p-aminophenol, tetraglycidyl methylenedianiline, and the like.

Examples of the aliphatic epoxy compound may include 1,4-butanediol diglycidyl ether, 1,6-hexanediol diglycidyl ether, neopentyl glycol diglycidyl ether, trimethylolpropane triglycidyl ether, polyethylene glycol diglycidyl ether, glycerin triglycidyl ether, polypropylene glycol diglycidyl ethers; polyglycidyl ethers of polyether polyol obtained by adding one or more kinds of alkylene oxide to aliphatic polyhydric alcohols such as ethylene glycol, propylene glycol, glycerin, and the like; diglycidyl esters of aliphatic long-chain dibasic acids; monoglycidyl ethers of aliphatic higher alcohols; glycidyl ethers of higher fatty acids; epoxidated soybean oil; butyl epoxystearate; octyl epoxystearate; epoxidated linseed oil; epoxidated polybutadiene, and the like.

The hydrogenated epoxy compound refers to a resin obtained through selective hydrogenation of an aromatic epoxy compound in the presence of a catalyst under pressure. Examples of the aromatic epoxy compound may include bisphenol type epoxy resins such as diglycidyl ether of bisphenol A, diglycidyl ether of bisphenol F, diglycidyl ether of bisphenol S, and the like; novolac type epoxy resins, such as a phenol novolac epoxy resin, a cresol novolac epoxy resin, a hydroxybenzaldehyde phenol novolac epoxy resin, and the like; polyfunctional epoxy resins, such as a glycidyl ether of tetrahydroxy phenylmethane, a glycidyl ether of tetrahydroxy benzophenone, epoxidized polyvinylphenol, and the like. Although the hydrogenated epoxy resin can be obtained by adding hydrogen into a mother nucleus of the aromatic epoxy resin, a glycidyl ether of hydrogenated bisphenol A is preferred.

The cationic epoxy compound may be present in an amount of about 10 parts by weight to about 95 parts by weight based on 100 parts by weight of (A)+(B)+(C). Within this range of the cationic epoxy compound, the composition can provide high adhesion between the polarizer and the protective film, does not suffer excessive increase in viscosity and deterioration in cuttability due to brittleness by providing high modulus. The cationic epoxy compound is preferably present in an amount of about 20 parts by weight to about 87.5 parts by weight, more preferably about 40 parts by weight to about 90 part by weight, still more preferably about 50 parts by weight to about 80 part by weight.

The (meth)acrylic radical compound and the cationic epoxy compound may be present in a weight ratio (A):(B) of about 10:90 to about 50:50 based on 100 parts by weight of (A)+(B). With this weight ratio range, the composition can provide desired adhesion between the polarizer and the protective film, and high reliability.

Preferably, based on 100 wt % of the (meth)acrylic radical compound and the cationic epoxy compound, the (A) (meth)acrylic radical compound is present in an amount of about 0.01 wt % to about 59 wt % and the (B) cationic epoxy compound is present in an amount of about 41 wt % to about 99.99 wt %. Within this weight ratio range, the composition can provide desired adhesion between the polarizer and the protective film, and high reliability.

Phenoxy Resin

The phenoxy resin is added to the (meth)acrylic radical compound and the cationic epoxy compound to improve physical cohesion of a cured structure. That is, in the adhesive composition according to the invention, the (meth)acrylic radical compound may be cured by a photoinitiator, particularly, a photo radical polymerization initiator, the cationic epoxy compound may be cured by another photoinitiator, particularly, a photo cationic polymerization initiator, and the phenoxy resin may improve cohesion between cured products from (meth)acrylic radical compound and cationic epoxy compound by providing entanglement thereto.

The phenoxy resin is generally included in the adhesive composition by being dissolved in a solvent. However, since the (meth)acrylic radical compound and the cationic epoxy compound serve as solvents for the phenoxy resin, the adhesive composition of the invention is a solvent-free type composition.

The phenoxy resin may have a softening point of about 0° C. to about 200° C. (preferably in the range of about 100° C. to about 200° C.), a glass transition temperature (Tg) of about 0° C. to 200° C. (preferably in the range of about 50° C. to 100° C.), a weight average molecular weight of about 100 g/mol to about 2,000,000 g/mol (preferably in the range of about 30,000 g/mol to about 60,000 g/mol). Within this range of the phenoxy resin, the composition exhibits improved adhesion and reliability through improvement of cross-linking and cohesion.

Any of non-curable phenoxy resin may be used without limitation so long as the phenoxy resin does not exhibit curing reaction or is not cured by a photoinitiator described below.

In some embodiments, the phenoxy resin may include a resin compound represented by Formula 1:

[Formula 1]

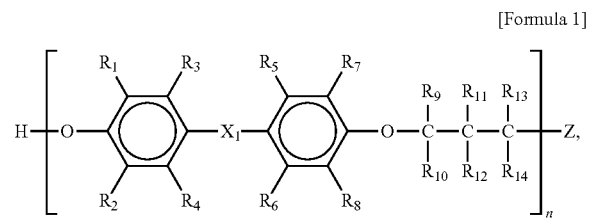

wherein $R_1$, $R_2$, $R_3$, $R_4$, $R_5$, $R_6$, $R_7$ and $R_8$ are the same or different and each is independently hydrogen, a halogen, a $C_1$-$C_{10}$ alkyl group, a $C_6$-$C_{20}$ aryl group, a $C_5$-$C_{20}$ cycloalkyl group or a nitro group; $R_9$, $R_{10}$, $R_{11}$, $R_{12}$, $R_{13}$ and $R_{14}$ are the same or different and each is independently hydrogen or a hydroxyl group, at least one of $R_9$, $R_{10}$, $R_{11}$, $R_{12}$, $R_{13}$ and $R_{14}$ is a hydroxyl group; $X_1$ is a single bond, $C_1$-$C_5$ linear or branched alkylene group; Z is a hydroxyl group or an epoxy group; and n is an integer from 30 to 400.

In some embodiments, the phenoxy resin may have a repeated structure of bisphenol A.

The phenoxy resin may be present in an amount of about 0.1 parts by weight to 5 parts by weight based on 100 parts by weight of (A)+(B)+(C). Within this range of the phenoxy resin, the adhesive composition does not suffer from deterioration in coatability due to excessive increase in viscosity. The phenoxy resin is preferably present in an amount of about 0.1 parts by weight to about 3 parts by weight, more preferably about 0.15 parts by weight to about 2.5 parts by weight.

Photoinitiator

The composition for adhesives may be a photocurable composition.

The photoinitiator may include a photo-radical polymerization initiator, a photo-cationic polymerization initiator, or combinations thereof.

The photoinitiator may be present in an amount of about 0.1 to about 10 parts by weight based on 100 parts by weight of (A)+(B)+(C). More preferably, the photoinitiator is present in an amount of about 0.1 parts by weight to about 2.5 parts by weight.

The photo-radical polymerization initiator may include typical photo-radical polymerization initiators capable of carrying out photocuring reaction without limitation. For example, the photo-radical polymerization initiator may include phosphorus, triazine, acetophenone, benzophenone, thioxanthone, benzoin, oxime initiators, or mixtures thereof. In one embodiment, the photo-radical polymerization initiator may be bisbenzoylphenyl phosphine oxide, benzoyldiphenyl phosphine oxide, or mixtures thereof.

The photo-radical polymerization initiator may be present in an amount of about 0.1 parts by weight to about 6 parts by weight based on 100 parts by weight of (A)+(B)+(C). Within this range of the photo-radical polymerization initiator, sufficient polymerization of the (meth)acrylic radical compound can be achieved while preventing the initiator from remaining in the composition. The photo-radical polymerization initiator is preferably present in an amount of about 0.1 parts by weight to about 1 part by weight.

Any typical photo-cationic polymerization initiator capable of carrying out photocuring reaction may be used as the photo-cationic polymerization initiator.

For example, the photo-cationic polymerization initiator may include onium salt compounds generating cation species and comprising cation species and anion species. Specific examples of cation species for onium salt compounds may include diaryliodonium, such as diphenyliodonium, 4-methoxydiphenyliodonium, bis(4-methylphenyl)iodonium, bis(4-tert-butylphenyl)iodonium, bis(dodecylphenyl) iodonium, and the like; triarylsulfonium such as triphenyl sulfonium, diphenyl-4-thiophenoxyphenylsulfonium; bis(4-(diphenylsulfonio)phenyl)sulfide, bis[4-(di(4-(2-hydroxyethyl)phenyl)sulfonio)-phenyl]sulfide, 5-2,4-(cyclopentadienyl)[1,2,3,4,5,6-η]-(methylethyl)-benzene]-iron(1+), and the like.

Specific examples of anion species for onium salt compounds may include tetrafluoroborate ($BF_4^-$), hexafluorophosphate ($PF_6^-$), hexafluoroantimonate ($SbF_6^-$), hexafluoroarsenate ($AsF_6^-$), hexachloroantimonate ($SbCl_6^-$), and the like.

The photo-cationic polymerization initiator may be present in an amount of about 0.1 parts by weight to 5 parts by weight based on 100 parts by weight of (A)+(B)+(C). Within this range, sufficient polymerization of the cationic epoxy compound can be achieved while preventing the initiator from remaining in the composition. The photo-cationic polymerization initiator is preferably present in an amount of about 0.1 parts by weight to 3 parts by weight.

The adhesive composition may be prepared by mixing the (meth)acrylic radical compound, the cationic epoxy compound, and the photoinitiator, followed by adding the phenoxy resin to the mixture.

The adhesive composition may further include antioxidants, UV absorbents, ionic conductors, additives for conductivity such as conductive metal oxide particles, additives for light spreading properties, viscosity adjustors, and the like in amounts not deteriorating effects of the present invention.

With the components as described above, the adhesive composition may have a viscosity at 25° C. of less than about 150 cPs. Within this viscosity range, the adhesive composition can exhibit good coatability. The adhesive composition preferably has a viscosity from about 1 cPs to about 135 cPs, more preferably from about 40 cPs to about 135 cPs.

The composition may include about 9 wt % to about 57 wt %, preferably about 10 wt % to about 57 wt %, more preferably about 19 to 50 wt % of the (meth)acrylic radical compound; about 40 wt % to about 90 wt %, preferably about 48 wt % to about 80 wt % of the cationic epoxy compound; about 0.1 wt % to 3 wt % of the phenoxy resin; and about 0.1 wt % to about 3 wt % of the photoinitiator in terms of solid content.

In accordance with another aspect of the invention, a polarizing plate may include an adhesive layer formed of the adhesive composition of the invention. FIG. 1 is a sectional view of a polarizing plate according to one embodiment. Referring to FIG. 1, a polarizing plate 100 may include a polarizer 10, a first protective film 20 formed on an upper side of the polarizer 10, and a second protective film 30 formed on a lower side of the polarizer 10, wherein a first adhesive layer 40 is formed between the first protective film 20 and the polarizer 10 and a second adhesive layer 50 is formed between the polarizer 10 and the second protective film 30.

At least one of the first and second adhesive layers 40, 50 may be formed of the adhesive composition for polarizing plates of the present invention.

In FIG. 1, the adhesive layers formed of the adhesive composition according to the embodiment of the invention are respectively formed on both sides of the polarizer. However, it should be understood that the adhesive layer formed of the adhesive composition may be formed on one or both sides of the polarizer. The adhesive layers formed on both sides of the polarizer may be the same or different.

The polarizer may be prepared from a film of a polyvinyl alcohol resin. Examples of the polyvinyl alcohol resin may include saponified products of polyvinyl alcohol, polyvinyl formal, polyvinyl acetal, ethylene acetate vinyl copolymer, and the like. A film formed of a polyvinyl alcohol resin may have a degree of saponification of about 99 mol % or more, preferably from about 99 mol % to about 99.5 mol %, a degree of polymerization of about 2000 or more, preferably from about 2000 to about 2500, and a thickness from about 10 μm to about 200 μm.

The polarizer may be prepared by dyeing a polyvinyl alcohol resin film with iodine and stretching the polyvinyl alcohol resin film. The film may be stretched in a ratio of about 2.0 to about 6.0. After stretching, the film may be subjected to color correction by through dipping in a boric acid solution and an aqueous potassium iodide solution.

The protective film is stacked on one or both sides of the polarizer and any transparent film suitable for use as a polarizing plate may be used as the protective film without limitation. The protective film may be prepared from a material selected from the group consisting of celluloses including triacetyl cellulose (TAC), polyesters including polyethylene terephthalate polyethylene (PET), cyclo-polyolefins (COP), polycarbonates (PC), polyacrylates, polyethersulfones, polysulfones, polyamides, polyimides, polyolefins, polyarylates, polyvinyl alcohols, polyvinyl chlorides, polyvinylidene chlorides, and mixtures thereof.

The protective film may have a thickness from about 25 μm to about 500 μm. Within this thickness range, the protective film can be applied to the polarizing plate. Preferably, the protective film has a thickness of about 25 μm to about 100 μm.

The protective film may be subjected to surface treatment, for example, corona pretreatment at about 250 mJ/cm² or more, before application of the adhesive composition or before preparation of the polarizing plate.

The polarizing plate may be prepared by any typical method. In some embodiments, a protective film having an adhesive composition layer is prepared by depositing the adhesive composition on one side of the protective film. As needed, the adhesive composition layer may be subjected to drying and the like. The adhesive composition may be coated by, for example, die coating, roll coating, gravure coating, spin coating, and the like on the protective film. Then, a stack product is prepared by stacking the protective film having the adhesive composition layer on each of upper and lower surfaces of a polarizer while the adhesive composition layer is contacted with the polarizer. The adhesive composition layer is cured by UV irradiation to form an adhesive layer, thus form a polarizing plate Although the intensity of UV irradiation is not particularly limited, UV irradiation is performed at a wavelength of about 200 nm to about 450 nm and an intensity of illumination of about 1 mW/cm² to about 500 mW/cm² to have a UV irradiation dose of about 10 mJ/cm² to about 10,000 mJ/cm². UV irradiation may be performed using a metal halide lamp or the like. UV irradiation may be performed at a temperature of about 22° C. to about 25° C. and a relative humidity of about 20% to about 60%.

The polarizing plate according to the invention has high cohesion, durability and cross-linking density, thereby providing high adhesion/reliability.

In some embodiments, when the polarizing plate is dipped in water having a constant temperature of 60° C. for 2 hours, the polarizer may have a maximum shrinkage length of about 2 mm or less at one end thereof, preferably about 0.1 mm to about 2 mm, more preferably about 0.1 mm to about 1.7 mm, and still more preferably about 0.3 mm to about 1.0 mm. In this case, the polarizing plate has a size of 5 cm×5 cm (length×width), and an adhesive layer is stacked to a thickness of 1 μm on either side of a 20 μm thick polarizer, followed by stacking a protective film having a thickness of 30 μm to 80 μm to provide a structure as shown in FIG. 1.

As used herein, the term "shrinkage length" means the shortest distance from one end of the protective film to one end of the polarizer adjacent the one end of the protective film in the polarizing plate after the polarizing plate is dipped in warm water for example warm water having a constant temperature of 60° C. for 2 hours. The protective film does not shrink even after dipping test in warm water, whereas the polarizer can shrink upon dipping test in warm water. The adhesive layer prepared from the adhesive composition of the present invention may decrease the shrinkage of the polarizer in the dipping of the polarizing plate by interfering of the shrinkage of the polarizer by cohesion.

In accordance with a further aspect of the invention, an optical member may include the adhesive composition for polarizing plates, an adhesive layer formed of the adhesive composition, or a polarizing plate including the same.

The optical member refers to a typical display device including the polarizing plate, and may include a liquid crystal display, an organic light emitting display (OLED), and the like, without being limited thereto.

Figure 2:
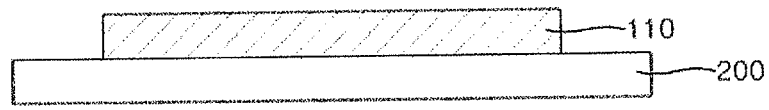
FIG. 2 illustrates a sectional view of an optical member in accordance with one embodiment of the present invention.

FIG. 2 is a sectional view of an optical member in accordance with one embodiment of the invention.

Referring to FIG. 2, the optical member may include a display panel 200; and a polarizing plate 110 formed on an upper side of the display panel 200.

Hereinafter, the present invention will be explained in more detail with reference to the following examples and comparative examples. It should be understood that these examples are provided for illustration only and are not to be in any way construed as limiting the present invention.

Detailed components of adhesive compositions used in the following examples and comparative examples were as follows.

A. (Meth)acrylic radical compound:
(A1) 2-hydroxyethyl acrylate (2-HEA) (100%, SK Cytec)
(A2) 4-hydroxybutyl acrylate (4-HBA) (100%, Osaka Organic)

B. Cationic epoxy compound:
(B1) Alicyclic diepoxy carboxylate (CY-179, Huntmans)
(B2) Aliphatic epoxy (monofunctional, water-soluble) (EX-216, Nagase)
(B3) Bisphenol A aromatic epoxy (YX8000, JER)

C. Phenoxy resin:
(C1) PKHB (Phenoxy resin, softening temperature: 200° C., Tg: 84° C., Mw: 32,000 g/mol, INCHEM),
(C2) PKHH (Phenoxy resin, softening temperature: 200° C., Tg: 92° C., Mw: 52,000 g/mol, INCHEM)

D. Photoinitiator:
(D1) Photo-radical polymerization initiator: 2,4,6-trimethylbenzoyl-diphenyl-phosphineoxide (Darocure TPO, Ciba)
(D2) Photo-cationic polymerization initiator: triarylsulfonium salt containing $PF_6^-$ and $SbF_6^-$ as anionic species (CPI-210S)

E. Alkyl group-containing monomer:
(E1) Ethyl acrylate (100%, Samchum Chemical)
(E2) Butyl acrylate (100%, Samchum Chemical).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE 1

Without using a solvent, 49.85 parts by weight of (A1) 2-hydroxyethyl acrylate (2-HEA) as a (meth)acrylic radical compound, 50 part by weight of (B1) alicyclic diepoxy carboxylate (CY-179) as a cationic epoxy compound, 0.5 parts by weight of (D1) a photo-radical polymerization initiator and 2 parts by weight of (D2) a photo-cationic polymerization initiator were mixed. Then, 0.15 parts by weight of (C1) PKHB as a phenoxy resin was added to the mixture, thereby preparing an adhesive composition.

EXAMPLES 2 TO 9 AND COMPARATIVE EXAMPLES 1 TO 8

Adhesive compositions were prepared in the same manner as in Example 1, except that the amounts and kinds of the (meth)acrylic radical compound, cationic epoxy compound, phenoxy resin and photoinitiator were changed as in Table 1 (unit: parts by weight).

TABLE 1

|  | A | | B | | | C | | D | | E | |
|---|---|---|---|---|---|---|---|---|---|---|---|
|  | A1 | A2 | B1 | B2 | B3 | C1 | C2 | D1 | D2 | E1 | E2 |
| Example 1 | 49.85 | — | 50 | — | — | 0.15 | — | 0.5 | 2 | — | — |
| Example 2 | 39.85 | — | 60 | — | — | 0.15 | — | 0.5 | 2 | — | — |
| Example 3 | 29.85 | — | 70 | — | — | 0.15 | — | 0.5 | 2 | — | — |
| Example 4 | 19.85 | — | 80 | — | — | 0.15 | — | 0.5 | 2 | — | — |
| Example 5 | 47.5 | — | 50 | — | — | 2.5 | — | 0.5 | 2 | — | — |
| Example 6 | — | 39 | 60 | — | — | 1 | — | 0.5 | 2 | — | — |
| Example 7 | 39 | — | 60 | — | — | — | 1 | 0.5 | 2 | — | — |
| Example 8 | 39 | — | — | 60 | — | 1 | — | 0.5 | 2 | — | — |
| Example 9 | 39 | — | — | — | 60 | 1 | — | 0.5 | 2 | — | — |
| Comparative Example 1 | 60 | — | 40 | — | — | — | — | 0.5 | 2 | — | — |
| Comparative Example 2 | 59.95 | — | 40 | — | — | 0.05 | — | 0.5 | 2 | — | — |
| Comparative Example 3 | 44 | — | 50 | — | — | 6 | — | 0.5 | 2 | — | — |
| Comparative Example 4 | — | — | 40 | — | — | 1 | — | 0.5 | 2 | 59 | — |
| Comparative Example 5 | — | — | — | 40 | — | 1 | — | 0.5 | 2 | — | 59 |
| Comparative Example 6 | — | 60 | — | 40 | — | — | — | 0.5 | 2 | — | — |
| Comparative Example 7 | 10 | — | 90 | — | — | — | — | 0.5 | 2 | — | — |
| Comparative Example 8 | — | — | 99 | — | — | — | — | 1 | 0.5 | 2 | — | — |

Preparation of Polarizing Plate

An 80 μm thick polyvinyl alcohol film (degree of saponification: 99.5 mol %, degree of polymerization: 2000) was used as a base film. The base film was dipped in 0.3% iodine solution for dyeing and was subjected to stretching at a ratio of 5.0 times. Then, the stretched base film was dipped in a boric acid solution at a concentration of 3% and an aqueous solution of 2% potassium iodide for color correction, followed by drying at 50° C. for 4 minutes, thereby preparing a polarizer.

As a first transparent protective film, an 80 μm thick triacetate cellulose (TAC) film was used and subjected to corona treatment at 250 mJ/cm$^2$ or more.

As a second transparent protective film, a 30 μm thick cyclo-polyolefin (COP) film was used and subjected to corona treatment at 250 mJ/cm$^2$ or more.

A polarizing plate was prepared by combining the first protective film, the adhesive composition, the polarizer, the adhesive composition and the second protective film in this order at 22~25° C. and 20~60% RH, followed by UV irradiation at 400 mW/cm$^2$ to 1000 mJ/cm$^2$ using a metal halide lamp at 22~25° C. and 20~60% RH.

The prepared adhesive compositions or the polarizing plate were evaluated as to the following properties. Results are shown in Table 2.

(1) Adhesion: To confirm adhesion of the polarizing plate, a cutter blade was inserted into a portion between the protective film and the polarizer at one end of the polarizing plate. No insertion of the cutter blade between the protective film and the polarizer was evaluated as ⊚, slight insertion of the cutter blade was evaluated as ○, slight insertion of the cutter blade and tearing of the protective film due to strength thereof was evaluated as Δ, and easy insertion of the cutter blade was evaluated as X.

(2) Cuttability: To confirm cuttability of the polarizing plate, each of the polarizing plates having a size of 500 mm×500 mm (length×width) and prepared in the examples and the comparative examples was punched from the protective film (80 μm thick triacetyl cellulose (TAC)) side using a cutter blade. The peeled state of one end at four sides of the punched polarizing plate was visibly observed. No peeling was evaluated as ⊚, peeling to a length of 1 mm or less was evaluated as ○, peeling to a length of greater than 1 mm to 2 mm or less was evaluated as Δ, and peeling to a length of greater than 2 mm was evaluated as X.

(3) Water resistance (warm water dipping testing): Each of the polarizing plates prepared in the examples and the comparative examples was cut to a size of 5 cm×5 cm (length×width). Each of the prepared polarizing plate was dipped in water having constant temperature of 60° C. for 2 hours. Decoloration of the polarizer and maximum shrinkage length at one end of the polarizer were measured. The shrinkage length means the shortest distance from one end of the protective film to one end of the polarizer adjacent the one end of the protective film in the polarizing plate in the course of warm water dipping test above. Although the protective film did not shrink during water resistance testing, the polarizer shrunk when dipped in warm water. No decoloration of the polarizer was evaluated as ○ (shrinkage length of 2 mm or less), partial decoloration was evaluated as Δ (shrinkage length of 3 mm or less to more than 2 mm), and complete decoloration was evaluated as X (shrinkage length of more than 3 mm).

(4) Viscosity: The adhesive composition was stored in a pyrostat (25° C.) for 24 hours. After 400 g of the composition was placed in a 500 ml Nalgene bottle (73.8 mm outer diameter×169.8 mm height), the viscosity of the composition was measured using a Brookfield viscometer DV-II+ at 25° C. at 100 rpm with Spindle No. #7.

TABLE 2

| | Adhesion | Cuttability | Polarizer separation | Polarizer shrinkage length (mm) | Viscosity (25° C., cPs) |
|---|---|---|---|---|---|
| Example 1 | ⊚ | ⊚ | ○ | 0.5 | 40 |
| Example 2 | ⊚ | ⊚ | ○ | 0.3 | 68 |
| Example 3 | ⊚ | ○ | ○ | 1.7 | 103 |
| Example 4 | ⊚ | ○ | ○ | 1.5 | 127 |
| Example 5 | ⊚ | ⊚ | ○ | 0.8 | 75 |
| Example 6 | ⊚ | ⊚ | ○ | 0.7 | 87 |
| Example 7 | ⊚ | ⊚ | ○ | 1.0 | 85 |
| Example 8 | ○ | ⊚ | ○ | 1.5 | 45 |
| Example 9 | ○ | ⊚ | ○ | 1.6 | 135 |
| Comparative Example 1 | Δ | ⊚ | X | 5.5 | 28 |
| Comparative Example 2 | Δ | ⊚ | X | 5.8 | 30 |
| Comparative Example 3 | Δ | X | Δ | 2.4 | 250 |
| Comparative Example 4 | X | X | X | 4.5 | 29 |
| Comparative Example 5 | X | X | X | 3.7 | 32 |
| Comparative Example 6 | X | Δ | Δ | 2.7 | 27 |
| Comparative Example 7 | Δ | X | X | 6.4 | 235 |
| Comparative Example 8 | X | X | X | 6.6 | 351 |

As shown in Table 2, the polarizing plate including an adhesive layer formed of the adhesive composition according to the invention exhibited good adhesion, cuttability and water resistance, and thus did not suffer separation of the polarizer and had a polarizer shrinkage length of 2 mm or less during warm water dipping testing. In addition, the adhesive composition according to the invention had a viscosity of less than 150 cPs, indicating good coatability.

Those skilled in the art will understand that the present invention is not limited by the aforementioned embodiments and the drawings, and that various modifications, changes, and alterations can be made without departing from the spirit and scope of the invention. Therefore, these embodiments are provided for illustration only and are not to be construed in any way as limiting the present invention.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A polarizing plate comprising a polarizer and a protective film stacked on and fixed to one or both sides of the polarizer via an adhesive layer,
   wherein the adhesive layer comprises:
   19 part by weight to 50 parts by weight of (A) a (meth) acrylic radical compound, the (meth)acrylic radical compound being a monofunctional (meth)acrylic radical compound and including a (meth)acrylate compound containing a $C_1$-$C_{20}$ alkyl group that has at least one hydrophilic group,
   50 parts by weight to 80 parts by weight of (B) a cationic epoxy compound, the cationic epoxy compound including an alicyclic epoxy compound, an aromatic epoxy compound, an aliphatic epoxy compound, a hydrogenated epoxy compound, or mixtures thereof,
   0.1 parts by weight to 2.5 parts by weight of (C) a phenoxy resin, the phenoxy resin being a non-curable phenoxy resin, and
   0.1 parts by weight to 10 parts by weight of (D) a photoinitiator, all amounts based on 100 parts by weight of (A)+(B)+(C),
   wherein the polarizer has a maximum shrinkage length of about 2 mm or less at one end thereof when the polarizing plate is dipped in water having a constant temperature of 60° C. for 2 hours.

2. The polarizing plate according as claimed in claim 1, wherein the (C) phenoxy resin comprises a non-curable phenoxy resin.

3. The polarizing plate according as claimed in claim 1, wherein the (C) phenoxy resin has a repeated structure of bisphenol A.

4. The polarizing plate according as claimed in claim 1, wherein the (C) phenoxy resin comprises a resin compound represented by Formula 1:

[Formula 1]

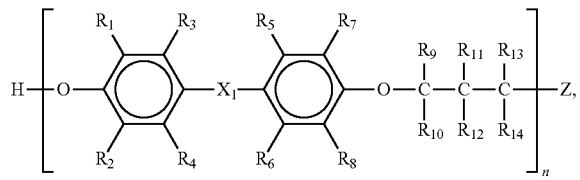

wherein $R_1$, $R_2$, $R_3$, $R_4$, $R_5$, $R_6$, $R_7$ and $R_8$ are the same or different and each is independently hydrogen, a halogen, a $C_1$-$C_{10}$ alkyl group, a $C_6$-$C_{20}$ aryl group, a $C_5$-$C_{20}$cycloalkyl group or a nitro group; $R_9$, $R_{10}$, $R_{11}$, $R_{12}$, $R_{13}$ and $R_{14}$ are the same or different and each is independently hydrogen or a hydroxyl group, at least one of $R_9$, $R_{10}$, $R_{11}$, $R_{12}$, $R_{13}$ and $R_{14}$ is a hydroxyl group; $X_1$ is a single bond, $C_1$-$C_5$ linear or branched alkylene group; Z is a hydroxyl group or an epoxy group; and n is an integer from 30 to 400.

5. The polarizing plate according as claimed in claim 4, wherein the (C) phenoxy resin has a weight average molecular weight of about 30,000 g/mol to about 60,000 g/mol.

6. The polarizing plate according as claimed in claim 1, wherein a weight ratio of the (A) (meth)acrylic radical compound : the (B) cationic epoxy compound ranges from about 10:90 to about 50:50 based on 100 parts by weight of (A)+(B).

7. The polarizing plate according as claimed in claim 1, wherein the (B) cationic epoxy compound comprises an alicyclic epoxy compound, an aromatic epoxy compound, an aliphatic epoxy compound, a hydrogenated epoxy compound, or mixtures thereof.

8. An optical member, comprising:
   a display panel; and
   a polarizing plate,
   wherein:
   the polarizing plate includes a polarizer and a protective film stacked on one or both sides of the polarizer via an adhesive layer, the one side of the polarizer facing the display panel such that the adhesive layer and the protective film are between the display panel and the polarizer,
   the adhesive layer includes (A) a (meth)acrylic radical compound, (B) a cationic epoxy compound, (C) a phenoxy resin, and (D) a photoinitiator, and
   the polarizer has a maximum shrinkage length of about 2 mm or less at one end thereof when the polarizing plate is dipped in water having a constant temperature of 60° C. for 2 hours.

9. The optical member as claimed in claim 8, wherein the adhesive layer is prepared from an adhesive composition that includes:
   19 part by weight to less than 50 parts by weight of (A) the (meth)acrylic radical compound, the (meth)acrylic radical compound being a monofunctional (meth)acrylic radical compound and including a (meth)acrylate compound containing a $C_1$-$C_{20}$ alkyl group that has at least one hydrophilic group,
   50 parts by weight to 80 parts by weight of (B) the cationic epoxy compound, the cationic epoxy compound including an alicyclic epoxy compound, an aromatic epoxy compound, an aliphatic epoxy compound, a hydrogenated epoxy compound, or mixtures thereof,
   0.1 parts by weight to 2.5 parts by weight of (C) the phenoxy resin, the phenoxy resin being a non-curable phenoxy resin, and
   0.1 parts by weight to 10 parts by weight of (D) the photoinitiator, all amounts based on 100 parts by weight of (A)+(B)+(C).

* * * * *